United States Patent [19]
Kang et al.

[11] Patent Number: 5,565,017
[45] Date of Patent: Oct. 15, 1996

[54] HIGH TEMPERATURE OXYGEN PRODUCTION WITH STEAM AND POWER GENERATION

[75] Inventors: Doohee Kang, Macungie, Pa.; Robert M. Thorogood, Cary, N.C.; Rodney J. Allam, Guildford; Anthony K. J. Topham, Walton on Thames, both of England; Steven L. Russek, Allentown, Pa.

[73] Assignee: Air Products and Chemicals, Inc., Allentown, Pa.

[21] Appl. No.: 428,610

[22] Filed: Apr. 25, 1995

Related U.S. Application Data

[63] Continuation-in-part of Ser. No. 168,988, Dec. 17, 1993, abandoned.

[51] Int. Cl.$^6$ .............................. B01D 53/22; B01D 71/02
[52] U.S. Cl. .............................. 95/14; 95/17; 95/18; 95/54
[58] Field of Search .................................... 95/14, 17, 18, 95/39–42, 45, 54; 204/129

[56] References Cited

U.S. PATENT DOCUMENTS

| | | | |
|---|---|---|---|
| 4,545,787 | 10/1985 | Hegarty | 55/16 |
| 4,560,394 | 12/1985 | McDonald et al. | 95/54 |
| 5,035,727 | 7/1991 | Chen | 55/16 |
| 5,108,465 | 4/1992 | Bauer et al. | 95/54 |
| 5,118,395 | 6/1992 | Chen et al. | 204/59 |
| 5,160,618 | 11/1992 | Burggraaf et al. | 210/490 |
| 5,160,713 | 11/1992 | Mazanec et al. | 95/54 X |
| 5,169,415 | 12/1992 | Roettger et al. | 95/54 |
| 5,174,866 | 12/1992 | Chen et al. | 204/59 |
| 5,240,473 | 8/1993 | Carolan et al. | 95/54 X |
| 5,245,110 | 9/1993 | Van Dijk et al. | 585/946 |

FOREIGN PATENT DOCUMENTS

WO93/06041 4/1993 WIPO.

OTHER PUBLICATIONS

Wright, J. D., Copeland, R. J., "Advanced Oxygen Separation Membranes", Report No. TDA–GRI–90/0303, prepared for the Gas Research Institute, Sep. 1990.

Clark, D. J. et al, "Separation of Oxygen by Using Zirconia Solid Electrolyte Membranes" in *Gas Separation and Purification* 1992, vol. 6, No. 4, pp. 201–205.

Dharmadhikari, S., "Understanding Gas Turbine Cycles" in *The Chemical Engineer*, 28 Jan. 1993, pp. 17–20.

*Primary Examiner*—Robert Spitzer
*Attorney, Agent, or Firm*—John M. Fernbacher

[57] ABSTRACT

Oxygen is separated from air by a high temperature ion transport membrane which is integrated with a gas turbine system for energy recovery from the membrane nonpermeate stream. Air is compressed, heated in a first heating step, and passed through the feed side of a mixed conductor membrane zone to produce a high purity oxygen product on the permeate side of the membrane zone. Nonpermeate gas from the membrane zone is heated in a second heating step and passed through a hot gas turbine for power recovery. Water is added to the nonpermeate gas prior to the hot gas turbine to increase mass flow to the turbine and thus balance the mass flows of the air feed compressor and the expansion turbine. The operating temperatures of the membrane zone and the expansion turbine are independently maintained by controlling the rate of heat addition in the first and second heating steps and by controlling the rate of water addition, whereby the membrane zone and expansion turbine are thermally delinked for maximum oxygen recovery efficiency.

23 Claims, 3 Drawing Sheets

HIGH TEMPERATURE OXYGEN PRODUCTION WITH STEAM AND POWER GENERATION

This application is a Continuation-in-Part of U.S. Ser. No. 08/168,988 filed Dec. 17, 1993, now abandoned.

FIELD OF THE INVENTION

The invention pertains to the recovery of oxygen by a high temperature ion transport membrane system, and in particular to heat integration of a mixed conductor membrane system with a hot gas expansion turbine.

BACKGROUND OF THE INVENTION

Oxygen is an economically important gas which is widely used in large-scale industrial applications. New uses for oxygen are emerging in advanced high-temperature processes for iron and steel manufacture, coal gasification, oxygen-enriched combustion, and in particular integrated gasification combined cycle power generation. In these large-scale applications, the cost of oxygen produced by conventional cryogenic or noncryogenic technology is a major portion of the overall operating cost, and lower oxygen cost will encourage the commercialization of these emerging technologies. New oxygen separation processes which can be thermally integrated with these advanced high-temperature processes will reduce the energy consumed in oxygen production, which in turn will promote the technical and commercial development of such integrated systems.

Oxygen can be recovered from air at high temperatures by inorganic oxide ceramic materials utilized in the form of selectively permeable nonporous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of ion transport membranes is given in a report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. The effective use of this energy in the overall operation of an ion transport membrane system is necessary if the system is to be competitive with conventional cryogenic technology for large scale oxygen production. Energy recovery and effective utilization thereof is possible by the integration of compressors, combustors, hot gas turbines, steam turbines, and heat exchangers with the mixed conductor membrane module. U.S. Pat. No. 4,545,787 discloses the production of oxygen and net power in the integrated operation of a mixed conductor ceramic membrane. Air is compressed, heated, and passed through a membrane separator to produce an oxygen permeate and an oxygen-containing non-permeate stream. The non-permeate stream is combusted with a fuel and the hot combustion gases are expanded in a hot gas turbine. The turbine provides shaft power for the compressor and drives a generator for export of electricity, and turbine exhaust is optionally used to cogenerate steam or to preheat the compressed air membrane feed. Alternately, the membrane is placed downstream of the combustion step.

U.S. Pat. No. 5,035,727 describes the recovery of oxygen by a solid electrolyte membrane in conjunction with an externally-fired gas turbine in which compressed air is heated indirectly and passed through the membrane module. Non-permeate gas is expanded through a hot gas turbine, the turbine exhaust is heated by direct combustion, and the combustion products provide heat indirectly to the membrane feed. Steam is recovered from the waste heat after heat exchange with the membrane feed.

U.S. Pat. No. 5,118,395 describes the recovery of oxygen from gas turbine exhaust utilizing a solid electrolyte membrane with the coproduction of electric power and steam. A supplemental burner heats the turbine exhaust prior to the membrane, and steam is generated by the membrane non-permeate stream. Related U.S. Pat. No. 5,174,866 discloses a similar system in which intermediate turbine exhaust is passed through the membrane and the membrane non-permeate stream is further expanded through another turbine stage. In both patents, turbine shaft power is used to drive the air compressor and an electric generator.

The report by J. D. Wright and R. J. Copeland identified above discloses at p. 55 a gas turbine-driven ceramic membrane system in which air is compressed, heated indirectly in a fired heater, and passed through the membrane to yield oxygen and non-permeate gas. The nonpermeate gas is combusted with natural gas in the fired heater and the combustion products are expanded through a hot gas turbine to drive the compressor and generate electric power. Heating of the air feed to the membrane and the combustion of fuel and non-permeate gas prior to the turbine thus are accomplished in a single integrated combustion chamber.

U.S. Pat. No. 5,245,110 (equivalent to PCT International Publication No. WO 93/06041) discloses the integration of a gas turbine with an oxygen-selective membrane system. The permeate side of the membrane is swept with air to yield an enriched air product containing about 35 vol % oxygen. The enriched air product is used in a hydrocarbon reformer or gasifier process, and tail gas from the reformer or gasifier is introduced into the gas turbine combustor to balance the flow of hot gas to the turbine. The nitrogen from the permeate and membrane sweep air replaces the mass lost when oxygen is consumed in the reformer or gasifier process, which maintains the turbine in a desired mass and thermal balance.

An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

A combined cycle power generation system is a highly efficient system which utilizes a gas turbine to drive an electric generator, wherein heat is recovered from the turbine exhaust as steam which drives an additional electric generator. A description of typical combined cycle power generation systems is given in *The Chemical Engineer,* 28

January 1993, pp. 17–20. The compressor, combustor, and expansion turbine are carefully designed and integrated to maximize the efficiency of each component and thus the efficiency of the integrated system. Preferably these systems are operated at steady-state design conditions, since significant deviations from these conditions will adversely affect system efficiency.

The successful development and commercialization of oxygen production by ion transport membranes will require flexible systems which maximize energy utilization and allow operation of system components at optimum conditions. In addition, the integration of such systems with an available heat source and heat sink, such as a gas turbine power generation system, is highly desirable. The invention disclosed below and described in the following claims advances the art and provides improved methods for the production of oxygen by means of an integrated ion transport membrane/gas turbine system.

SUMMARY OF THE INVENTION

The invention is a process for recovering oxygen from an oxygen-containing gas mixture by (a) compressing and heating the oxygen-containing gas mixture, (b) passing the resulting compressed and heated mixture into a membrane separation zone comprising one or more oxygen-selective ion transport membranes, and (c) withdrawing from this zone a hot high-purity oxygen permeate stream and a hot oxygen-containing nonpermeate stream. Water is introduced (d) into the hot oxygen-containing non-permeate stream, (e) the resulting non-permeate stream is further heated, and (f) the heated non-permeate stream is passed through an expansion turbine to generate shaft power. An exhaust stream is withdrawn from the turbine.

The operating temperatures of the membrane separation zone and the expansion turbine are independently maintained by controlling one or more of the variables selected from the group consisting of the rate of heat addition in step (a), the rate of heat addition in step (e), and the rate of water introduction in step (d), whereby the membrane separation zone and the expansion turbine are thermally delinked for maximum efficiency in recovering said oxygen.

Heating is accomplished in one embodiment by direct-fired burners prior to the membrane separation zone and the expansion turbine respectively, and the temperatures of the membrane zone and expansion turbine are independently maintained by controlling the firing rate of each burner along with the rate of water addition. Alternatively, the membrane zone feed can be heated by indirect heat exchange with combustion gases from a direct-fired burner utilizing the membrane nonpermeate stream. Optionally, the compressed oxygen-containing gas mixture can be preheated by indirect heat exchange with the hot gas turbine exhaust prior to final heating and flow to the membrane zone.

In an alternative embodiment, the process for recovering oxygen from an oxygen-containing gas mixture comprises the steps of (a) compressing and heating the oxygen-containing gas mixture; (b) passing the resulting compressed and heated mixture of step (a) into a membrane separation zone comprising one or more oxygen-selective ion transport membranes, and withdrawing therefrom a hot high-purity oxygen permeate stream and a hot oxygen-containing non-permeate stream; (c) further heating the hot oxygen-containing non-permeate stream; (d) introducing water into the resulting further heated oxygen-containing non-permeate stream of step (c); and (e) passing the resulting water-containing nonpermeate stream of step (d) through an expansion turbine to generate shaft power and withdrawing therefrom a turbine exhaust stream.

The operating temperatures of the membrane separation zone and the expansion turbine are independently maintained by controlling one or more of the variables selected from the group consisting of the rate of heat addition in step (a), the rate of heat addition in step (c), and the rate of water introduction in step (d), whereby the membrane separation zone and the expansion turbine are thermally delinked for maximum efficiency in recovering oxygen.

In another alternative embodiment, the process for recovering oxygen from an oxygen-containing gas mixture comprises the steps of (a) compressing the oxygen-containing gas mixture; (b) dividing the resulting compressed gas mixture of step (a) into a first and a second compressed gas stream; (c) heating the first and second compressed gas streams and combining the resulting heated streams into a combined feed stream; (d) passing the combined feed stream into a membrane separation zone comprising one or more oxygen-selective ion transport membranes; (e) withdrawing from the membrane separation zone a high-purity oxygen permeate stream and an oxygen-containing non-permeate stream; (f) further heating the non-permeate stream by combusting the stream with a fuel in a direct-fired burner; (g) introducing water into the resulting further heated non-permeate stream of step (f); and (h) passing the resulting water-containing non-permeate stream from step (g) through an expansion turbine to generate shaft power and withdrawing therefrom a turbine exhaust stream.

The operating temperatures of the membrane separation zone and the expansion turbine are independently maintained by controlling one or more of the variables selected from the group consisting of the rate of heat addition to the first compressed gas stream in step (c), the rate of heat addition to the second compressed gas stream in step (c), the rate of fuel added to the direct-fired burner of step (f), and the rate of water introduction in step (g), whereby the membrane separation zone and the expansion turbine are thermally delinked for maximum efficiency in recovering oxygen.

In yet another alternative embodiment, the process for recovering oxygen from an oxygen-containing gas mixture comprises the steps of (a) compressing the oxygen-containing gas mixture; (b) dividing the resulting compressed gas mixture of step (a) into a first and a second compressed gas stream; (c) heating the first and second compressed gas streams and combining the resulting heated streams into a combined feed stream; (d) passing the combined feed stream into a membrane separation zone comprising one or more oxygen-selective ion transport membranes; (e) withdrawing from the membrane separation zone a high-purity oxygen permeate stream and an oxygen-containing non-permeate stream; (f) introducing water into the oxygen-containing non-permeate stream; (g) heating the resulting water-containing non-permeate stream of step (f) by combusting the stream with a fuel in a direct-fired burner; and (h) passing the resulting heated water-containing non-permeate stream of step (g) through an expansion turbine to generate shaft power and withdrawing therefrom a turbine exhaust stream.

The operating temperatures of the membrane separation zone and the expansion turbine are independently maintained by controlling one or more of the variables selected from the group consisting of the rate of heat addition to the first compressed gas stream in step (c), the rate of heat addition to the second compressed gas stream in step (c), the rate of fuel added to the direct-fired burner of step (g), and the rate of water introduction in step (f), whereby the membrane separation zone and the expansion turbine are thermally delinked for maximum efficiency in recovering oxygen.

By utilizing the methods of the present invention, it is possible to thermally delink the operation of the membrane zone and the hot gas expansion turbine by operating each at the optimum temperature for maximum overall efficiency of the oxygen recovery process and simultaneously to balance mass flow through the feed air compressor and expansion turbine.

DETAILED DESCRIPTION OF THE INVENTION

The present invention utilizes a solid ceramic ion transport membrane integrated with a high-temperature process in which heat is utilized effectively for the operation of both the membrane and the high-temperature process. The membrane and the high-temperature process are operated at different temperatures to maximize the performance of each. The membrane operates by a mechanism in which an oxygen partial pressure differential or a voltage differential across the membrane causes oxygen ions to migrate through the membrane from the feed side to the permeate side where the oxygen ions recombine to form oxygen gas and free electrons. An ion transport membrane of the pressure-driven type is defined herein as a mixed conductor membrane, in which the electrons simultaneously migrate through the membrane to preserve internal electrical neutrality. The term pressure-driven means that oxygen ions move through the membrane in the direction of decreasing partial pressure. An ion transport membrane of the electrically-driven type is defined herein as a solid electrolyte membrane, in which the electrons flow from the permeate side to the feed side of the membrane in an external circuit driven by a voltage differential. A mechanically perfect membrane of either type operating without gas leakage is infinitely selective for oxygen; in practical applications a high-purity oxygen product containing at least 98 vol % oxygen is achievable.

The present invention comprises several embodiments of a process to recover oxygen from an oxygen-containing gas mixture, preferably air, at high temperature utilizing a mixed conductor membrane which is heat integrated with a hot gas expansion turbine to maximize the efficiency of energy use in recovering oxygen with the alternate coproducts steam and electricity. The key feature of all embodiments of the invention as described herein is the thermal decoupling or delinking of the mixed conductor membrane and the hot gas turbine, which means that each is operated at a temperature which allows the most efficient operation of the combined system. This is achieved by controlled firing of direct-fired combustors as described in the following specification.

Figure 1:
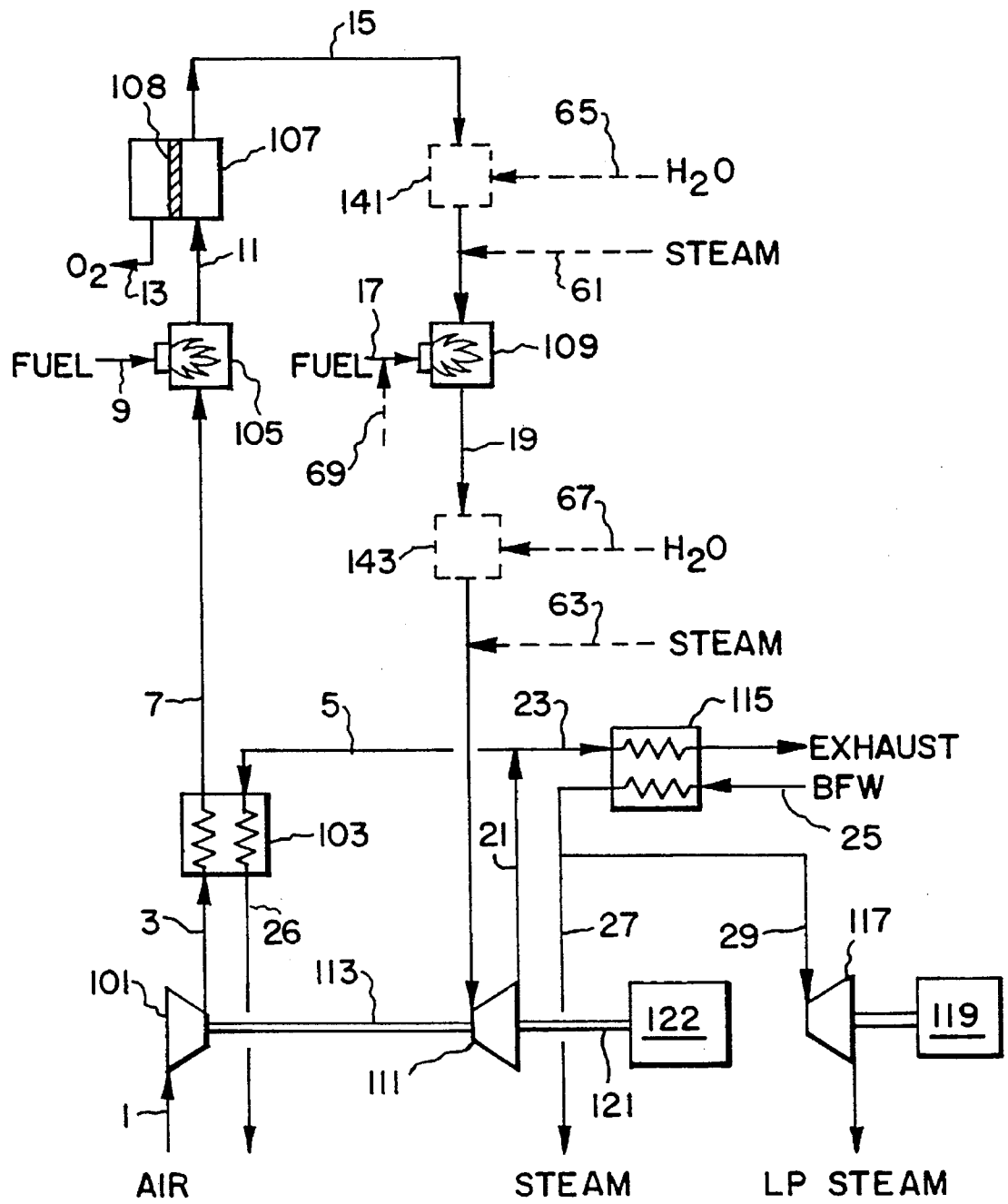
FIG. 1 is a process flow diagram of a first embodiment of the present invention.

A first embodiment of the invention is given in FIG. 1. Oxygen-containing gas 1, preferably air, is compressed in compressor 101 to a pressure between 50 and 500 psia, preferably 80 to 300 psia. Compressor 101 is a centrifugal, axial, or reciprocal compressor, optionally multistaged, and optionally intercooled. When operating without intercooling in an adiabatic mode, compressed feed 3 will be at a temperature of 360° to 1,100° F.; when operated with intercooling in an isothermal mode, compressed feed 3 will be at 150° to 300° F. Compressed feed is optionally preheated in heat exchange zone 103 by indirect heat exchange with hot process stream 5 (later defined) and heated stream 7 passes into direct-fired burner 105. This burner is a combustor, for example the type known and used in the gas turbine art, is preferably gas-fired, and utilizes fuel gas 9 which is natural gas, synthesis gas comprising hydrogen and carbon monoxide, refinery fuel gas containing mixed hydrocarbons, or another combustible gas mixture. Burner 105 is operated with sufficient excess air such that hot combustion stream 11 contains about 10–20 vol % oxygen at a temperature of 800° to 2,000° F., preferably 1,000° to 1,600° F. Stream 11 passes through the feed side of membrane separation zone 107 comprising membrane 108, preferably a mixed conductor membrane, wherein oxygen diffuses through the membrane driven by an oxygen partial pressure differential in the range of 2 to 80 psi, and high purity oxygen stream 13 containing at least 98 vol % oxygen is withdrawn therefrom at 2 to 30 psia. Hot non-permeate stream 15 is withdrawn at near feed pressure and contains 6 to 18 vol % oxygen. Membrane 108 operates in the temperature range of 800° to 2,000° F., preferably 1,000° to 1,600° F. Membrane separation zone 107 typically is sized and operated such that up to about 90 % of the oxygen in membrane feed 11 is recovered as product 13.

Alternatively, ion transport membrane 108 can be of the solid electrolyte type as described earlier which is driven by a voltage differential across the membrane in which electrons are conducted through an external circuit with porous electrodes attached to the surfaces of the membrane. In this mode of operation the oxygen permeate product can be recovered at or above the feed pressure.

Ion transport membrane 108 is typically a solid ceramic assembly in the form of tubes, sheets, or a monolithic honeycomb. The membrane divides membrane separation zone 107 into a feed side having a higher oxygen partial pressure and a permeate side having a lower oxygen partial pressure. Typical compositions of the active membrane material are given in representative articles by Y. Teraoka et al in *Chemistry Letters,* 1985, pp. 1743–1746 and by H. Iwahara et al in *Advances in Ceramics,* Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Preferred membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$ where x is between 0 and 1.

Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

Referring again to FIG. 1, nonpermeate stream 15, now containing 6 to 18 vol % oxygen, is combusted with fuel 17 in direct-fired burner 109 (which typically is similar to burner 105) to generate hot combustion product 19 at 800° to 3,000° F. at a pressure between 50 and 500 psia. Hot combustion product 19 is passed through hot gas expansion turbine 111 to generate shaft power, and exhaust 21 is withdrawn therefrom at 200° to 1100° F. and a pressure between 15 and 40 psia. Turbine 111 is of the type well-known in the gas turbine art, such as the turbine of Model LM500 manufactured by General Electric. Optionally, turbine 111 can be mechanically linked with compressor 101 by shaft 113 whereby the required compression power is supplied by turbine 111. Optionally, a portion of the shaft power of turbine 111 via shaft 121 is used to produce electricity in generator 122.

Optionally, at least a portion 23 of the turbine exhaust 21 is utilized in heat exchange zone 115 to vaporize boiler feedwater 25 to generate steam 27 typically at 100 to 1,500 psia. Steam 27 can be exported as a major product, or optionally at least a portion 29 can be expanded in steam turbine 117 to provide shaft power directly or indirectly for compressor 101, or to drive generator 119 to produce electricity for internal use or export.

Optionally, at least a portion 5 of turbine exhaust 21 is utilized as the previously-identified hot process stream 5 in heat exchange zone 103 to preheat compressed feed 3. Additional heat can be recovered from cooled turbine exhaust 26 if the exhaust temperature is sufficiently high, for example if compressor 101 is operated in an adiabatic mode. In such a case, exhaust 26 can be introduced at an appropriate location in heat exchange zone 115 to generate additional steam 27 or 29.

In the operation of the process described above with reference to FIG. 1, the mass flow rates of compressed air stream 3 and hot combustion product 19 will differ due to the combustion of fuels 9 and 17 (which adds mass to the gas stream) and the withdrawal of oxygen product 13 (which removes mass from the gas stream). If compressor 101 and expansion turbine 111 are designed specifically for integrated operation via shaft 113 to accommodate the increased mass flow due to combustion, the withdrawal of oxygen product 13 will reduce the mass flow to expansion turbine 111 and could cause mechanical and operating problems with the compressor and/or turbine. To alleviate such problems, water is introduced upstream of expansion turbine 111 to compensate for the lost mass flow due to withdrawal of oxygen 13 and this can be accomplished by several alternative methods.

Referring again to FIG. 1, the appropriate flow of steam 61 or steam 63 can be introduced respectively into the influent 15 or effluent 19 of burner 109. This steam preferably is obtained from the process, for example as a portion of steam 27, or can be generated by indirect heat exchange with hot oxygen permeate 13. If necessary, steam can be obtained from an external source. An alternative method for increasing the mass flow of the gas stream to expansion turbine 111 is to inject water as a liquid or a mixture of liquid and vapor directly into either influent 15 or effluent 19 of burner 109. This can be accomplished by feeding the appropriate flow of water 65 or water 67 into direct contact vaporizer 141 or direct contact vaporizer 143 respectively. Alternatively, water can be injected directly into burner 109 if the burner is properly designed for such injection (not shown). In another optional mode, steam 69 can be added to fuel 17 prior to burner 109. In yet another optional mode, fuel gas 17 is humidified or saturated with water vapor by direct contact with water (not shown). Preferably the water is provided by heating ambient water by indirect contact with a portion of turbine exhaust 21 or hot oxygen permeate stream 13. Any combination of water streams 61, 63, 65, 67, or 69 can be utilized to control the operating conditions for expansion turbine 111. For example, fuel 17 can be humidified at a constant rate while steam 63 is added at a controlled rate to compensate for variations in system operation.

An essential feature of the invention illustrated in the embodiment of FIG. 1 is the independent operation of mixed conductor membrane separation zone 107 and expansion turbine 111 at different temperatures by appropriate control of the respective firing rates of direct-fired burners 105 and 109 by controlling the flow rates of fuel gas 9 and 17 respectively, and also by controlling the addition rates of water streams 61, 63, 65, 67, and/or 69. For example, a preferred membrane 108 operates at 1,650° F. while turbine 111 operates most efficiently at a typical inlet temperature of 2,000° F. and the process of the present invention enables independent control of these temperatures by the firing rates of direct-fired burners 105 and 109 as well as the rates of water addition. Such control was not possible using prior art processes earlier described.

Figure 2:
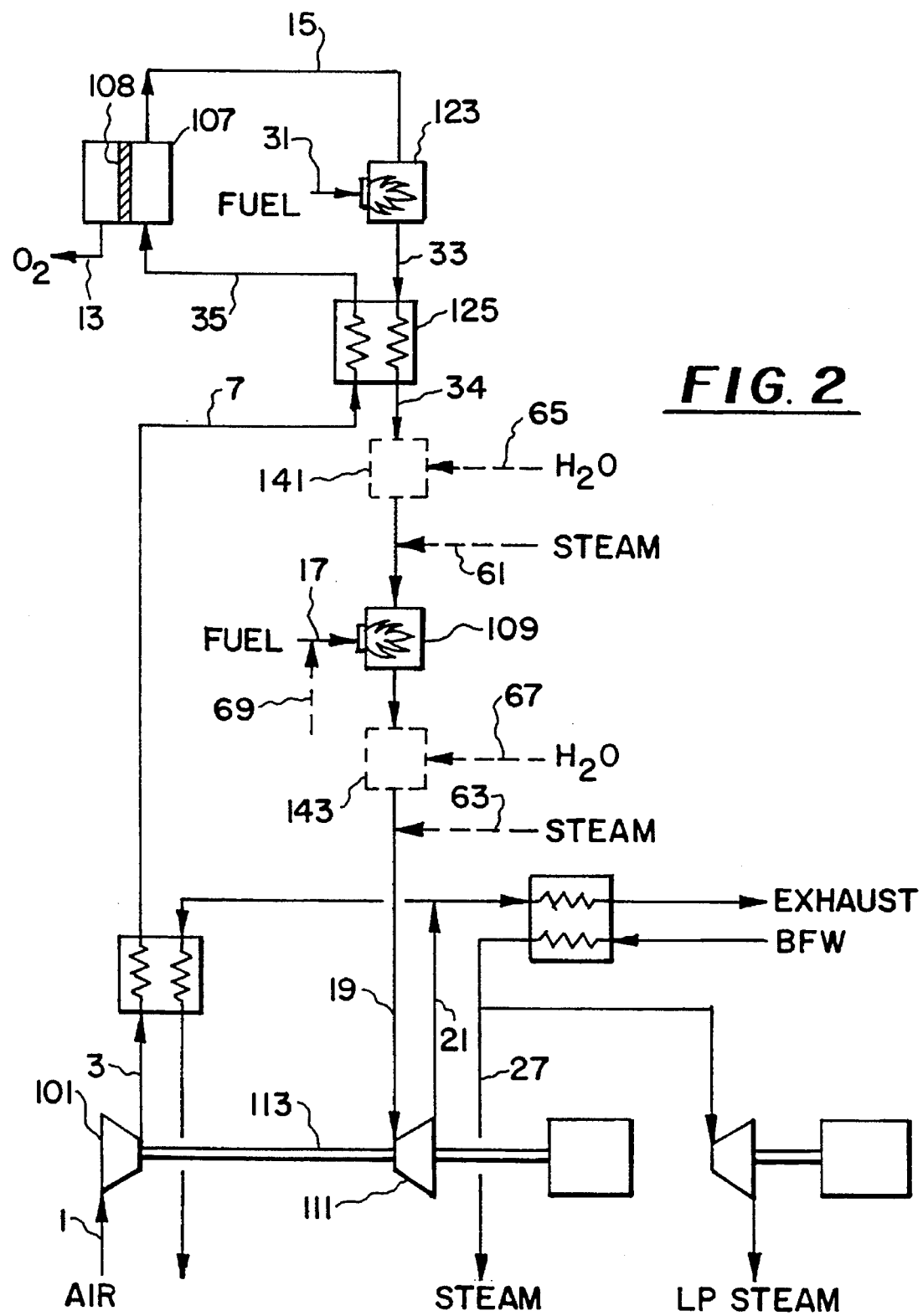
FIG. 2 is a process flow diagram of a second embodiment of the present invention.

An alternate embodiment of the invention is illustrated in FIG. 2, which is identical to the embodiment of FIG. 1 except that burner 105 is eliminated and replaced by direct-fired burner 123 which combusts fuel 31 with oxygen-containing non-permeate stream 15, and also that compressed gas mixture 7 is heated indirectly in heat exchange zone 125 against effluent 33 from burner 123. Indirectly heated compressed gas 35, which is preferably air as earlier stated, passes into membrane separation zone 107. This differs from the previous embodiment in that membrane separation zone 107 receives air feed while in the previous embodiment the membrane receives combustion product from burner 105. Thus in the embodiment of FIG. 2 the membrane receives a feed containing 21 vol % oxygen while in FIG. 1 the membrane feed following combustion contains less oxygen, thereby requiring more membrane surface area for the equivalent oxygen recovery at equivalent temperatures and total pressures. However, the embodiment of FIG. 1 does not require heat exchange zone 125 as does the embodiment of FIG. 2, and thus FIG. 1 is a simpler system.

In the operation of the process described above with reference to FIG. 2, in a manner similar to the operation earlier described for the embodiment of FIG. 1, the mass flow rates of compressed air stream 3 and hot combustion product 19 will differ due to the combustion of fuels 31 and 17 (which adds mass to the gas stream) and the withdrawal of oxygen product 13 (which removes mass from the gas stream). If compressor 101 and expansion turbine 111 are designed specifically for integrated operation via shaft 113 to accommodate the increased mass flow due to combustion, the withdrawal of oxygen product 13 will reduce the mass flow to expansion turbine 111 and could cause mechanical and operating problems with the compressor and/or turbine. To alleviate such problems, water is introduced upstream of expansion turbine 111 to compensate for the lost mass flow due to withdrawal of oxygen 13 and this can be accomplished by several alternative methods. Referring to FIG. 2, the appropriate flow of steam 61 or steam 63 can be introduced respectively into the influent 15 or effluent 19 of burner 109. This steam preferably is obtained from the process, for example as a portion of steam 27, or can be generated by indirect heat exchange with hot oxygen permeate 13. If necessary, steam can be obtained from an external source. An alternative method for increasing the mass flow of the gas stream to expansion turbine 111 is to inject water as a liquid or a mixture of liquid and vapor directly into either influent 15 or effluent 19 of burner 109. This can be accomplished by feeding the appropriate flow of water 65 or water 67 into direct contact vaporizer 141 or direct contact vaporizer 143 respectively. Alternatively, water can be injected directly into burner 109 if the burner is properly designed for such injection (not shown). In another optional mode, steam 69 can be added to fuel 17 prior to burner 109. In yet another optional mode, fuel gas 17 is humidified or saturated with water vapor by direct contact with water (not shown). Preferably the water is provided by heating ambient water by indirect contact with a portion of turbine exhaust 21 or hot oxygen permeate stream 13. Any combination of water streams 61, 63, 65, 67, or 69 can be utilized to control the operating conditions for expansion turbine 111. For example, fuel 17 can be humidified at a constant rate while steam 63 is added at a controlled rate to compensate for variations in system operation.

An essential feature of the invention illustrated in the embodiment of FIG. 2, which is also the essential feature of the embodiment as earlier described for FIG. 1, is the independent operation of mixed conductor membrane separation zone 107 and expansion turbine 111 at different temperatures by appropriate control of the respective firing rates of direct-fired burners 123 and 109 by controlling the flow rates of fuel gas 31 and 17 respectively, and also by control of the rates of water addition of streams 61, 63, 65, 67, and/or 69.

Figure 3:
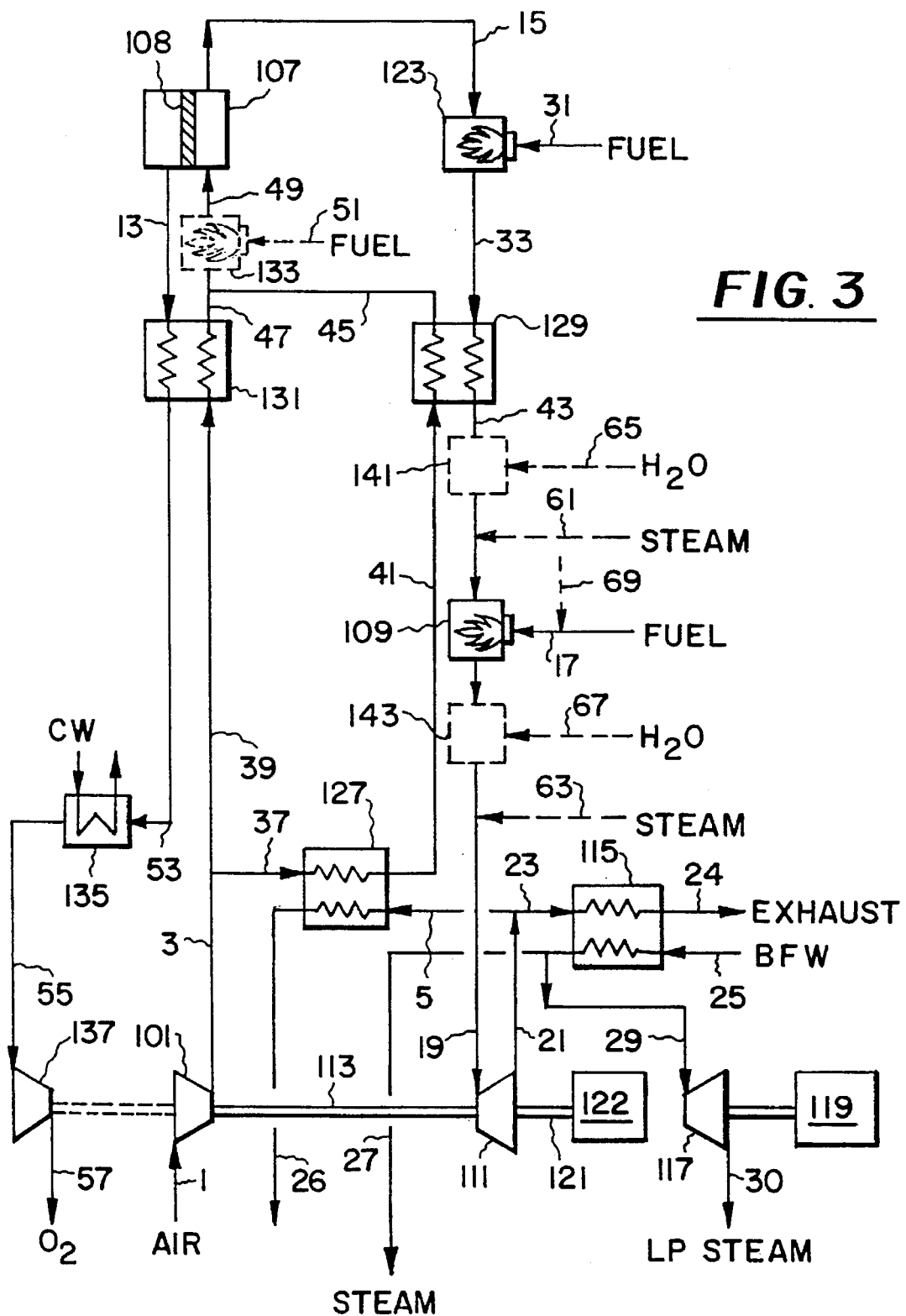
FIG. 3 is a process flow diagram of a third embodiment of the present invention.

An alternate embodiment of the invention is illustrated in FIG. 3. Oxygen-containing gas 1, preferably air, is compressed in compressor 101 to a pressure between 50 and 500 psia, preferably 80 to 300 psia as described in the previous embodiments. Compressed stream 3 is split into streams 37 and 39. Stream 37 is optionally preheated by indirect heat exchange with expansion turbine exhaust 5 in heat exchange zone 127, and stream 41 is heated to 800° to 2,000° F. by indirect heat exchange with hot combustion gas stream 33 in heat exchange zone 129, yielding cooled stream 43 which contains 5 to 20 vol % oxygen and heated split feed 45. Split feed stream 39 optionally is preheated by indirect heat exchange with hot high purity oxygen permeate stream 13 in heat exchange zone 131 and the resulting heated stream 47 is combined with heated split stream 45. Combined stream 49 flows through the feed side of mixed conductor membrane separation zone 107 comprising mixed conductor membrane 108, wherein oxygen diffuses through the membrane driven by an oxygen partial pressure differential in the range of 2 to 80 psi, and high purity oxygen stream 13 containing at least 98 vol % oxygen is withdrawn therefrom at 2 to 30 psia. Non-permeate stream 15 is withdrawn at near feed pressure and contains 6 to 20 vol % oxygen. Membrane 108 operates in the temperature range of 800° to 2,000° F., preferably 1,000° to 1,600° F. Mixed conductor membrane 108 has been described earlier with reference to FIG. 1.

Optionally, oxygen product stream 53 is further cooled in cooler 135, and cooled stream 55 is drawn through vacuum blower 137 at a pressure of 2 to 30 psia to yield product 57. This is a preferred operating mode because the oxygen partial pressure driving force across membrane 108 is increased significantly, which reduces the necessary membrane area for a given oxygen production rate.

Oxygen-containing non-permeate stream 15 is combusted with fuel 31 in direct-fired burner 123, and hot combustion gas stream 33 is cooled against split feed 41 in heat exchange zone 129, yielding cooled stream 43 earlier described. Stream 43 which contains 5 to 21 vol % oxygen is combusted with fuel 17 in direct-fired burner 109 (which is similar to burner 105 of FIG. 1) to generate hot combustion product 19 at 800° to 3,000° F. at a pressure between 50 and 500 psia. Hot combustion product 19 is passed through hot gas expansion turbine 111 to generate shaft power, and exhaust 21 is withdrawn therefrom at 200° to 1,100° F. and a pressure between 15 and 40 psia. Turbine 111 is of the type well-known in the gas turbine art as earlier described. Optionally, turbine 111 can be mechanically linked with compressor 101 by shaft 113 whereby the required compression power is supplied by turbine 111.

Optionally, at least a portion 23 of the turbine exhaust 21 can be utilized in heat exchange zone 115 to vaporize boiler feed water 25 to generate steam 27 typically at 100 to 1,500 psia. Steam 27 can be exported as a major product, or optionally at least a portion 29 can be expanded in steam turbine 117 to provide shaft power directly or indirectly for compressor 101, or to drive generator 119 to produce electricity for internal use or export.

Optionally, at least a portion 5 of turbine exhaust 21 is utilized as previously described in heat exchange zone 127 to preheat split compressed feed 37. Additional heat can be recovered from cooled turbine exhaust 26 if the temperature is sufficiently high, for example if compressor 101 is operated in an adiabatic mode. In such a case, exhaust 26 can be introduced at the appropriate location in heat exchange zone 115 to generate additional steam 27 or 29.

In an optional mode, feed 49 to membrane separation zone 107 can be heated by combustion with fuel 51 in direct-fired burner 133, in which case burner 123 and heat exchange zone 129 are not required. This arrangement is similar to the embodiment of FIG. 1 which utilizes two burners 105 and 109, which are equivalent respectively to burners 133 and 109 of FIG. 3.

The split of compressed feed stream 3 into two streams 37 and 39 is controlled so that the flow rate of stream 39 closely matches the flow rate of stream 13, thereby simplifying the design of heat exchange zone 47 and utilizing the surface area of the exchanger most efficiently. Similarly, the flow rates of streams 33 and 41 will be matched, thereby simplifying the design of heat exchange zone 129 and utilizing the surface area of the exchanger most efficiently.

In the operation of the process described above with reference to FIG. 3, in a manner similar to the operations earlier described for the embodiments of FIGS. 1 and 2, the mass flow rates of compressed air stream 3 and hot combustion product 19 will differ due to the combustion of fuels 31 and 17 (which adds mass to the gas stream) and the withdrawal of oxygen product 13 (which removes mass from the gas stream). If compressor 101 and expansion turbine 111 are designed specifically for integrated operation via shaft 113 to accommodate the increased mass flow due to combustion, the withdrawal of oxygen product 13 will reduce the mass flow to expansion turbine 111 and could cause serious mechanical and operating problems with the compressor and/or turbine. To alleviate such problems, water is introduced upstream of expansion turbine 111 to compensate for the lost mass flow due to withdrawal of oxygen 13 and this can be accomplished by several alternative methods. Referring to FIG. 3, the appropriate flow of steam 61 or steam 63 can be introduced respectively into the influent 15 or effluent 19 of burner 109. This steam preferably is obtained from the process, for example as a portion of steam 27, or can be generated by indirect heat exchange with hot oxygen permeate 13. If necessary, steam can be obtained from an external source. An alternative method for increasing the mass flow of the gas stream to expansion turbine 111 is to inject water as a liquid or a mixture of liquid and vapor directly into either influent 15 or effluent 19 of burner 109. This can be accomplished by feeding the appropriate flow of water 65 or water 67 into direct contact vaporizer 141 or direct contact vaporizer 143 respectively. Alternatively, water can be injected directly into burner 109 if the burner is properly designed for such injection (not shown). In another optional mode, steam 69 can be added to fuel 17 prior to burner 109. In yet another optional mode, fuel gas 17 is humidified or saturated with water vapor by direct contact with water. (not shown). Preferably the water is provided by heating ambient water by indirect contact with a portion of turbine exhaust 21 or hot oxygen permeate stream 13. Any combination of water streams 61, 63, 65, 67, or 69 can be utilized to control the operating conditions for expansion turbine 111. For example, fuel 17 can be humidified at a constant rate while steam 63 is added at a controlled rate to compensate for variations in system operation.

The essential feature of the invention illustrated in the embodiment of FIG. 3, as described earlier for the embodiments of FIGS. 1 and 2, is the independent operation of mixed conductor membrane separation zone 107 and expansion turbine 111 at different temperatures by appropriate control of the firing rates of direct-fired burners 123 and 109 by regulating the flow rates of fuel gas 31 and 17 respectively, and also by control of the rates of water addition of streams 61, 63, 65, 67, and/or 69. As described earlier, the operating temperatures of membrane separation zone 107 and expansion turbine 111 are independently maintained, and therefore membrane separation zone 107 and expansion turbine 111 are thermally delinked for optimum efficiency in recovering oxygen 13 and optionally producing steam 27 or electric power by generator 119.

The invention in each of the three embodiments described above can be operated to produce oxygen as the sole product if no market exists for steam and/or electric power at a given location. In such a case, gas turbine exhaust 21 preferably is used to preheat compressed membrane feed 3 in heat exchange zone 103 of FIG. 1 or alternatively to preheat split feed 37 in heat exchange zone 127 of FIG. 3. If markets exist at a given location for steam and/or electric power as additional products, the preferred option is to produce oxygen and one or both of these additional products. In this case, gas turbine exhaust 21 is used to raise steam in heat exchange zone 115 which is either exported or used partially or totally to drive steam turbine 117 and generator 119.

The preferred operating mode is the production of oxygen with steam and/or electric power as coproducts. This is so because this mode minimizes the equipment requirements needed for oxygen production and provides the potential for effective energy integration with the steam and power systems of the oxygen user.

Heat exchange zone 115 as shown schematically in FIGS. 1–3 is essentially a steam boiler which recovers heat from hot gases by vaporizing boiler feed water as is known in the art. High temperature gas-gas heat exchange zones 103, 125, 129, and 131 as shown schematically in FIGS. 1–3 can utilize any type of heat exchanger appropriate for this service. Such heat exchangers are manufactured for example by Hague International and Heatric, Ltd.

EXAMPLE 1

A heat and material balance calculations were performed for an optional mode of FIG. 3 in which turbine exhaust 21 is used entirely in heat exchange zone 115 to generate 0.97 ton/day of steam 27 at 264.7 psia for export. Compressor 101 is driven by hot gas turbine 111. In this mode, feed 49 to membrane separation zone 107 is heated by combustion with fuel 51 in direct-fired burner 133 and burner 123 is not utilized. Steam turbine 117, generator 119, and preheat exchange zone 127 are not utilized. It was assumed for the calculations that gas pressure drops through heat exchange zones 129, 131, and 135, membrane zone 107, heat exchange zone 129, and burners 109 and 133 are negligible. Membrane separation zone 107 operates at a temperature of 1562° F. (850° C.) and a feed side pressure of 210 psia. Oxygen 13 is used to preheat feed 39 in heat exchange zone 131. Oxygen product 53 is cooled in cooler 135 and withdrawn at 6.8 psia by vacuum blower 137 to yield oxygen product 57 at 16.6 psia. The process is operated to produce 1.0 ton/day of oxygen 57 from 6.6 ton/day of air feed 3 at an oxygen recovery of 65% and to generate 17.8 KW of electric power. A stream summary for Example 1 is given in Table 1.

TABLE 1

Stream for Example 1

| Stream | Temperature (deg F.) | Pressure (psia) | Composition (mol %) | | | | | Flow Rate (lb/hr) | | | | | |
|---|---|---|---|---|---|---|---|---|---|---|---|---|---|
| | | | Nitrogen | Oxygen | Carbon Dioxide | Water | Methane | Nitrogen | Oxygen | Carbon Dioxide | Water | Methane | Total |
| 1 | 70 | 14.7 | 79.0 | 21.0 | 0.0 | 0.0 | 0.0 | 421.9 | 128.1 | 0.0 | 0.0 | 0.0 | 550.0 |
| 3 | 758 | 210 | 79.0 | 21.0 | 0.0 | 0.0 | 0.0 | 421.9 | 128.1 | 0.0 | 0.0 | 0.0 | 550.0 |
| 41 | 758 | 210 | 79.0 | 21.0 | 0.0 | 0.0 | 0.0 | 362.0 | 109.9 | 0.0 | 0.0 | 0.0 | 471.9 |
| 45 | 1312 | 210 | 79.0 | 21.0 | 0.0 | 0.0 | 0.0 | 362.0 | 109.9 | 0.0 | 0.0 | 0.0 | 471.9 |
| 39 | 758 | 210 | 79.0 | 21.0 | 0.0 | 0.0 | 0.0 | 59.9 | 18.2 | 0.0 | 0.0 | 0.0 | 78.1 |
| 47 | 1312 | 210 | 79.0 | 21.0 | 0.0 | 0.0 | 0.0 | 59.9 | 18.2 | 0.0 | 0.0 | 0.0 | 78.1 |
| 51 | 70 | 210 | 0.0 | 0.0 | 0.0 | 0.0 | 100.0 | 0.0 | 0.0 | 0.0 | 0.0 | 1.9 | 1.9 |
| 49 | 1562 | 210 | 78.5 | 19.6 | 0.6 | 1.2 | 0.0 | 421.9 | 120.6 | 5.2 | 4.2 | 0.0 | 551.9 |
| 13 | 1562 | 6.8 | 0.0 | 100.0 | 0.0 | 0.0 | 0.0 | 0.0 | 83.3 | 0.0 | 0.0 | 0.0 | 83.3 |
| 53 | 1029 | 6.8 | 0.0 | 100.0 | 0.0 | 0.0 | 0.0 | 0.0 | 83.3 | 0.0 | 0.0 | 0.0 | 83.3 |
| 55 | 95 | 6.8 | 0.0 | 100.0 | 0.0 | 0.0 | 0.0 | 0.0 | 83.3 | 0.0 | 0.0 | 0.0 | 83.3 |
| 57 | 320 | 16.6 | 0.0 | 100.0 | 0.0 | 0.0 | 0.0 | 0.0 | 83.3 | 0.0 | 0.0 | 0.0 | 83.3 |
| 15 | 1562 | 210 | 90.9 | 7.0 | 0.7 | 1.4 | 0.0 | 421.9 | 37.3 | 5.2 | 4.2 | 0.0 | 468.6 |
| 43 | 1029 | 210 | 90.9 | 7.0 | 0.7 | 1.4 | 100.0 | 421.9 | 37.3 | 5.2 | 4.2 | 0.0 | 468.6 |
| 17 | 70 | 210 | 0.0 | 0.0 | 0.0 | 0.0 | 0.0 | 0.0 | 0.0 | 0.0 | 0.0 | 7.0 | 7.0 |
| 19 | 2060 | 210 | 88.5 | 1.7 | 3.3 | 6.5 | 0.0 | 421.9 | 9.3 | 24.4 | 20.0 | 0.0 | 475.6 |
| 21 | 959 | 14.7 | 88.5 | 1.7 | 3.3 | 6.5 | 0.0 | 421.9 | 9.3 | 24.4 | 20.0 | 0.0 | 475.6 |
| 24 | 225 | 14.7 | 88.5 | 1.7 | 3.3 | 6.5 | 0.0 | 421.9 | 9.3 | 24.4 | 20.0 | 0.0 | 475.6 |
| 25 | 92 | 264.7 | 0.0 | 0.0 | 0.0 | 100.0 | 0.0 | 0.0 | 0.0 | 0.0 | 80.9 | 0.0 | 80.9 |
| 27 | 406 | 264.7 | 0.0 | 0.0 | 0.0 | 100.0 | 0.0 | 0.0 | 0.0 | 0.0 | 80.9 | 0.0 | 80.9 |

EXAMPLE 2

A heat and material balance calculations were performed for the optional mode of FIG. 3 as used in Example 1 in which turbine exhaust 21 is used entirely in heat exchange zone 115 to generate steam 27 at 264.7 psia. Compressor 101 is driven by hot gas turbine 111. In this mode, feed 49 to membrane separation zone 107 is heated by combustion with fuel 51 in direct-fired burner 133 and burner 123 is not utilized. Steam turbine 117, generator 119, and preheat exchange zone 127 are not utilized. It was assumed for the calculations that gas pressure drops through heat exchange zones 129, 131, and 135, membrane zone 107, heat exchange zone 129, and burners 109 and 133 are negligible. Steam 61 is injected into nonpermeate stream 43 prior to burner 109. Membrane separation zone 107 operates at a temperature of 1562° F. (850° C.) and a feed side pressure of 210 psia. Oxygen 13 is used to preheat feed 39 in heat exchange zone 131. Oxygen product 53 is cooled in cooler 135 and withdrawn at 6.8 psia by vacuum blower 137 to yield oxygen product 57 at 16.6 psia. The process is operated to produce 1.0 ton/day of oxygen 57 from 8.0 ton/day of air feed 3 at an oxygen recovery of 54% and to generate 34.6 KW of electric power. A stream summary for Example 2 is given in Table 2.

TABLE 2

Stream for Example 2

| Stream | Temperature (deg F.) | Pressure (psi) | Composition (mol %) | | | | | Flow Rate (lb/hr) | | | | | |
|---|---|---|---|---|---|---|---|---|---|---|---|---|---|
| | | | Nitrogen | Oxygen | Carbon Dioxide | Water | Methane | Nitrogen | Oxygen | Carbon Dioxide | Water | Methane | Total |
| 1 | 70 | 14.7 | 79.0 | 21.0 | 0.0 | 0.0 | 0.0 | 511.5 | 155.3 | 0.0 | 0.0 | 0.0 | 666.8 |
| 3 | 758 | 210 | 79.0 | 21.0 | 0.0 | 0.0 | 0.0 | 511.5 | 155.3 | 0.0 | 0.0 | 0.0 | 666.8 |
| 41 | 758 | 210 | 79.0 | 21.0 | 0.0 | 0.0 | 0.0 | 424.6 | 128.9 | 0.0 | 0.0 | 0.0 | 553.5 |
| 45 | 1312 | 210 | 79.0 | 21.0 | 0.0 | 0.0 | 0.0 | 424.6 | 128.9 | 0.0 | 0.0 | 0.0 | 553.5 |
| 39 | 758 | 210 | 79.0 | 21.0 | 0.0 | 0.0 | 0.0 | 86.9 | 26.4 | 0.0 | 0.0 | 0.0 | 113.3 |
| 47 | 1312 | 210 | 79.0 | 21.0 | 0.0 | 0.0 | 0.0 | 86.9 | 26.4 | 0.0 | 0.0 | 0.0 | 113.3 |
| 51 | 70 | 210 | 0.0 | 0.0 | 0.0 | 0.0 | 100.0 | 0.0 | 0.0 | 0.0 | 0.0 | 2.3 | 2.3 |
| 49 | 1562 | 210 | 78.5 | 19.7 | 0.6 | 1.2 | 0.0 | 511.5 | 146.2 | 6.3 | 5.1 | 0.0 | 669.1 |
| 13 | 1562 | 6.8 | 0.0 | 100.0 | 0.0 | 0.0 | 0.0 | 0.0 | 83.3 | 0.0 | 0.0 | 0.0 | 83.3 |
| 53 | 778 | 6.8 | 0.0 | 100.0 | 0.0 | 0.0 | 0.0 | 0.0 | 83.3 | 0.0 | 0.0 | 0.0 | 83.3 |
| 55 | 95 | 6.8 | 0.0 | 100.0 | 0.0 | 0.0 | 0.0 | 0.0 | 83.3 | 0.0 | 0.0 | 0.0 | 83.3 |
| 57 | 320 | 16.6 | 0.0 | 100.0 | 0.0 | 0.0 | 0.0 | 0.0 | 83.3 | 0.0 | 0.0 | 0.0 | 83.3 |
| 15 | 1562 | 210 | 88.4 | 9.5 | 0.7 | 1.4 | 0.0 | 511.5 | 62.9 | 6.3 | 5.1 | 0.0 | 585.8 |
| 43 | 1061 | 210 | 88.4 | 9.5 | 0.7 | 1.4 | 0.0 | 511.5 | 62.9 | 6.3 | 5.1 | 0.0 | 585.8 |
| 17 | 70 | 210 | 0.0 | 0.0 | 0.0 | 0.0 | 100.0 | 0.0 | 0.0 | 0.0 | 0.0 | 11.7 | 11.7 |
| 19 | 2060 | 210 | 72.4 | 2.0 | 3.4 | 22.2 | 0.0 | 511.5 | 16.1 | 38.4 | 100.8 | 0.0 | 666.8 |
| 21 | 993 | 14.7 | 72.4 | 2.0 | 3.4 | 22.2 | 0.0 | 511.5 | 16.1 | 38.4 | 100.8 | 0.0 | 666.8 |
| 24 | 225 | 14.7 | 72.4 | 2.0 | 3.4 | 22.2 | 0.0 | 511.5 | 16.1 | 38.4 | 100.8 | 0.0 | 666.8 |
| 25 | 92 | 264.7 | 0.0 | 0.0 | 0.0 | 100.0 | 0.0 | 0.0 | 0.0 | 0.0 | 129.9 | 0.0 | 129.9 |
| 27 | 406 | 264.7 | 0.0 | 0.0 | 0.0 | 100.0 | 0.0 | 0.0 | 0.0 | 0.0 | 129.9 | 0.0 | 129.9 |
| 61 | 406 | 264.7 | 0.0 | 0.0 | 0.0 | 100.0 | 0.0 | 0.0 | 0.0 | 0.0 | 69.3 | 0.0 | 69.3 |

Thus the process of the present invention is a highly energy- and cost-efficient method for the production of oxygen by the utilization of direct thermal energy using an ion transport membrane separation system. In contrast with prior art ion transport membrane processes, the present invention allows independent temperature control of the membrane and gas turbine, thereby thermally delinking each of these key components to allow the most efficient production of oxygen for a given process embodiment. The process may be operated solely for the production of oxygen, but preferably is operated to coproduce steam and/or electricity. In all embodiments of the invention, thermal delinking of the membrane and the gas turbine is the key feature which allows the most efficient overall operation. Steam addition to the nonpermeate stream before or after combustion prior to the gas turbine allows the proper balance of mass flows in the air compressor and gas turbine.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A process for recovering oxygen from an oxygen-containing gas mixture comprising the steps of:
   (a) compressing and heating said oxygen-containing gas mixture;
   (b) passing the resulting compressed and heated mixture of step (a) into a membrane separation zone comprising one or more oxygen-selective ion transport membranes, and withdrawing therefrom a hot high-purity oxygen permeate stream and a hot oxygen-containing non-permeate stream;
   (c) introducing water into said hot oxygen-containing non-permeate stream;
   (d) heating the resulting non-permeate stream of step (c); and
   (e) passing the heated non-permeate stream of step (d) through an expansion turbine to generate shaft power and withdrawing therefrom a turbine exhaust stream;
   wherein the operating temperatures of said membrane separation zone and said expansion turbine are independently maintained by controlling one or more of the variables selected from the group consisting of the rate of heat addition in step (a), the rate of heat addition in step (d), and the rate of water introduction in step (c), whereby said membrane separation zone and said expansion turbine are thermally delinked for maximum efficiency in recovering said high-purity oxygen permeate.

2. The process of claim 1 wherein said ion transport membranes are selected from the group consisting of mixed conductor membranes and solid electrolyte membranes.

3. The process of claim 1 which further comprises utilizing at least a portion of said shaft power to provide at least a portion of the power to compress said gas mixture in step (a).

4. The process of claim 1 wherein said heating of the resulting non-permeate stream in step (d) is accomplished at least in part by combusting a fuel with said resulting non-permeate stream in a direct-fired burner, wherein said rate of heat addition in step (d) is maintained by controlling the flow of said fuel to said direct-fired burner.

5. The process of claim 4 wherein said water is introduced into said hot oxygen-containing non-permeate stream by vaporizing liquid water in a direct-contact vaporization zone prior to said direct-fired burner.

6. The process of claim 4 wherein said water is introduced into said hot oxygen-containing non-permeate stream as steam.

7. The process of claim 6 wherein said steam is obtained by vaporizing liquid water by indirect heat exchange with said turbine exhaust stream.

8. The process of claim 6 wherein said steam is obtained by vaporizing liquid water by indirect heat exchange with said hot high-purity oxygen permeate stream.

9. The process of claim 4 wherein said water is introduced into said hot oxygen-containing non-permeate stream by injecting liquid water, steam, or a mixture thereof into said direct-fired burner.

10. The process of claim 4 wherein said water is introduced into said hot oxygen-containing non-permeate stream by injecting steam into the fuel to said direct-fired burner.

11. The process of claim 10 wherein said steam is obtained by vaporizing liquid water by indirect heat exchange with said turbine exhaust stream.

12. The process of claim 10 wherein said steam is obtained by vaporizing liquid water by indirect heat exchange with said hot high-purity oxygen permeate stream.

13. The process of claim 4 wherein said water is introduced into said hot oxygen-containing non-permeate stream by heating and humidifying the fuel to said direct-fired burner, wherein said fuel is a gaseous fuel.

14. A process for recovering oxygen from an oxygen-containing gas mixture comprising the steps of:
   (a) compressing and heating said oxygen-containing gas mixture;
   (b) passing the resulting compressed and heated mixture of step (a) into a membrane separation zone comprising one or more oxygen-selective ion transport membranes, and withdrawing therefrom a hot high-purity oxygen permeate stream and a hot oxygen-containing non-permeate stream;
   (c) further heating said hot oxygen-containing non-permeate stream;
   (d) introducing water into the resulting further heated oxygen-containing non-permeate stream of step (c); and
   (e) passing the resulting water-containing non-permeate stream of step (d) through an expansion turbine to generate shaft power and withdrawing therefrom a turbine exhaust stream;
   wherein the operating temperatures of said membrane separation zone and said expansion turbine are independently maintained by controlling one or more of the variables selected from the group consisting of the rate of heat addition in step (a), the rate of heat addition in step (c), and the rate of water introduction in step (d), whereby said membrane separation zone and said expansion turbine are thermally delinked for maximum efficiency in recovering said high-purity oxygen permeate.

15. The process of claim 14 wherein said ion transport membranes are selected from the group consisting of mixed conductor membranes and solid electrolyte membranes.

16. The process of claim 14 which further comprises utilizing at least a portion of said shaft power to provide at least a portion of the power to compress said gas mixture in step (a).

17. A process for recovering oxygen from an oxygen-containing gas mixture comprising the steps of:
   (a) compressing said oxygen-containing gas mixture;
   (b) dividing the resulting compressed gas mixture of step (a) into a first and a second compressed gas stream;

(c) heating said first and second compressed gas streams and combining the resulting heated streams into a combined feed stream;

(d) passing said combined feed stream into a membrane separation zone comprising one or more oxygen-selective ion transport membranes;

(e) withdrawing from said membrane separation zone a high-purity oxygen permeate stream and an oxygen-containing non-permeate stream;

(f) further heating said non-permeate stream by combusting said stream with a fuel in a direct-fired burner;

(g) introducing water into the resulting further heated non-permeate stream of step (f); and (h) passing the resulting water-containing non-permeate stream from step (g) through an expansion turbine to generate shaft power and withdrawing therefrom a turbine exhaust stream;

wherein the operating temperatures of said membrane separation zone and said expansion turbine are independently maintained by controlling one or more of the variables selected from the group consisting of the rate of heat addition to said first compressed gas stream in step (c), the rate of heat addition to said second compressed gas stream in step (c), the rate of fuel added to said direct-fired burner of step (f), and the rate of water introduction in step (g), whereby said membrane separation zone and said expansion turbine are thermally delinked for maximum efficiency in recovering said high-purity oxygen permeate.

18. The process of claim 17 wherein said ion transport membranes are selected from the group consisting of mixed conductor membranes and solid electrolyte membranes.

19. The process of claim 17 which further comprises utilizing at least a portion of said shaft power to provide at least a portion of the power to compress said gas mixture in step (a).

20. A process for recovering oxygen from an oxygen-containing gas mixture comprising the steps of:

(a) compressing said oxygen-containing gas mixture;

(b) dividing the resulting compressed gas mixture of step (a) into a first and a second compressed gas stream;

(c) heating said first and second compressed gas streams and combining the resulting heated streams into a combined feed stream;

(d) passing said combined feed stream into a membrane separation zone comprising one or more oxygen-selective ion transport membranes;

(e) withdrawing from said membrane separation zone a high-purity oxygen permeate stream and an oxygen-containing non-permeate stream;

(f) introducing water into said oxygen-containing non-permeate stream;

(g) heating the resulting water-containing non-permeate stream of step (f) by combusting said stream with a fuel in a direct-fired burner; and (h) passing the resulting heated water-containing non-permeate stream from step (g) through an expansion turbine to generate shaft power and withdrawing therefrom a turbine exhaust stream;

wherein the operating temperatures of said membrane separation zone and said expansion turbine are independently maintained by controlling one or more of the variables selected from the group consisting of the rate of heat addition to said first compressed gas stream in step (c), the rate of heat addition to said second compressed gas stream in step (c), the rate of fuel added to said direct-fired burner of step (g), and the rate of water introduction in step (f), whereby said membrane separation zone and said expansion turbine are thermally delinked for maximum efficiency in recovering said high-purity oxygen permeate.

21. The process of claim 20 wherein said ion transport membranes are selected from the group consisting of mixed conductor membranes and solid electrolyte membranes.

22. The process of claim 20 which further comprises utilizing at least a portion of said shaft power to provide at least a portion of the power to compress said gas mixture in step (a).

23. A process for recovering oxygen from an oxygen-containing gas mixture comprising the steps of:

(a) compressing said oxygen-containing gas mixture;

(b) dividing the resulting compressed gas mixture of step (a) into a first and a second compressed gas stream;

(c) heating said first and second compressed gas streams and combining the resulting heated streams into a combined feed stream;

(d) heating said combined feed stream and passing the heated stream into a membrane separation zone comprising one or more oxygen-selective ion transport membranes;

(e) withdrawing from said membrane separation zone a high-purity oxygen permeate stream and an oxygen-containing non-permeate stream;

(f) cooling said oxygen-containing non-permeate stream by indirect heat exchange with said first compressed gas stream thereby heating said first compressed gas stream, and cooling said high-purity oxygen permeate stream by indirect heat exchange with said second compressed gas stream thereby heating said second compressed gas stream;

(g) introducing water into the resulting cooled oxygen-containing non-permeate stream of step (f);

(h) heating the resulting water-containing non-permeate stream of step (g) by combusting said stream with a fuel in a direct-fired burner; and (i) passing the resulting heated water-containing non-permeate stream from step (h) through an expansion turbine to generate shaft power and withdrawing therefrom a turbine exhaust stream;

wherein the operating temperatures of said membrane separation zone and said expansion turbine are independently maintained by controlling one or more of the variables selected from the group consisting of the rate of heat addition to said combined feed stream in step (d), the rate of heat addition to said water-containing non-permeate stream in step (h), and the rate of water introduction in step (g), whereby said membrane separation zone and said expansion turbine are thermally delinked for maximum efficiency in recovering said high-purity oxygen permeate.

* * * * *